(12) United States Patent
Chen et al.

(10) Patent No.: US 7,508,968 B2
(45) Date of Patent: Mar. 24, 2009

(54) IMAGE COMPOUNDING BASED ON INDEPENDENT NOISE CONSTRAINT

(75) Inventors: Yunqiang Chen, Plainsboro, NJ (US); Hongcheng Wang, Urbana, IL (US); Tong Fang, Morganville, NJ (US); Jason Jenn-Kwei Tyan, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 558 days.

(21) Appl. No.: 11/229,106

(22) Filed: Sep. 16, 2005

(65) Prior Publication Data

US 2006/0078181 A1    Apr. 13, 2006

Related U.S. Application Data

(60) Provisional application No. 60/612,064, filed on Sep. 22, 2004.

(51) Int. Cl.
*G06K 9/00* (2006.01)
*G06K 9/40* (2006.01)
*G06K 9/36* (2006.01)

(52) U.S. Cl. .................. 382/128; 382/254; 382/276
(58) Field of Classification Search .................. None
See application file for complete search history.

(56) References Cited

U.S. PATENT DOCUMENTS

| | | | | |
|---|---|---|---|---|
| 5,909,515 A | | 6/1999 | Makram-Ebeid | |
| 5,923,775 A | * | 7/1999 | Snyder et al. | 382/172 |
| 2002/0126910 A1 | * | 9/2002 | Gindele et al. | 382/254 |
| 2003/0016882 A1 | * | 1/2003 | Riley et al. | 382/275 |
| 2004/0071363 A1 | * | 4/2004 | Kouri et al. | 382/276 |
| 2005/0074158 A1 | * | 4/2005 | Kaufhold et al. | 382/132 |
| 2005/0141778 A1 | * | 6/2005 | Nakajima et al. | 382/254 |
| 2006/0087703 A1 | * | 4/2006 | Chen et al. | 358/463 |

OTHER PUBLICATIONS

O Brien "Pairwise Independent Random Variables" The Annals of Probability, 1980, vol. 8, No. 1, pp. 170-175.*
Tandori "On the Convergence of Series of Pairwise Independent Random Variables" ACTA Math Hung. 45(3-4) (1985) pp. 445-450.*
TRiggs et al. Matching Constraints and the Joint Image, pp. 1-6.*

* cited by examiner

*Primary Examiner*—Vikkram Bali
*Assistant Examiner*—Mia M Thomas (57) ABSTRACT

A method and system for improving image quality by compounding a plurality of images to mitigate the effects of image noise. The method utilizes the independency between noise components for multiple image compounding. An effective measurement is designed to regularize the independency between noise in a traditional generative model based filtering framework, thereby enabling a more robust algorithmic solution to inaccurate signal/noise modeling. The method generally comprises selecting a plurality of images, calculating the residual error on each image; calculating the noise likelihood of each image, calculating the signal likelihood of the image, performing an independence analysis to regularize an independence constraint between the residual errors of the images, and summing the signal likelihood, noise likelihood and pairwise independency to approximate the joint independency between the residual errors.

13 Claims, 5 Drawing Sheets

IMAGE COMPOUNDING BASED ON INDEPENDENT NOISE CONSTRAINT

REFERENCE TO RELATED APPLICATION

This application claims the benefit of U.S. Provisional Application No. 60/612,064, filed on Sep. 22, 2004, which is incorporated herein by reference in its entirety.

BACKGROUND

The invention relates generally to image processing, and more particularly, to methods and systems for improving image quality by compounding a plurality of images to mitigate the effects of image noise.

Almost every kind of data contains noise. Noise reduction is a required step for any sophisticated algorithm used in image processing. In medical image processing applications such as X-ray, ultrasound, magnetic resonance imaging (MRI), computed tomography (CT) and others, noise manifest during image capture, enhancement, and restoration needs to be suppressed while the original image structure is preserved. In medical imaging, image enhancement is important because it allows physicians to obtain a better visual interpretation, especially when viewing small structures (i.e. thin vessels). Moreover, enhancement is a preprocessing step for subsequent medical analysis, such as anatomy segmentation or registration of images from different modalities.

Most medical images have image quality characteristics such as contrast, sensitivity, detail (blurring), visual noise, spatial characteristics, and artifacts. Noise present in digital imaging is primarily due to the quantum noise inherent in photon detection and electronic noise. Electronic noise is relatively constant. However, quantum noise is related to the number of photons counted. Noise in an image is an undesirable, relatively high detail characteristic. Therefore, when images are processed to increase or enhance detail, the processing also increases the visibility of the noise. When reconstructing images from data, algorithms used employ filters that impact noise in the final image. Digital image processing generally reduces noise by blurring the image creating an undesirable tradeoff.

Using CT as one example, there are several adjustable protocol factors that have an effect on the image noise. Reducing voxel size, which increases detail, also increases noise because fewer protons are absorbed or captured in each voxel. Noise can be decreased by increasing the tube current—time product (mAs). However, this increases the dose to the patient.

Noise is produced by the random variation or difference in the number of photons from one voxel to another. The statistical variation in image noise increases as the number of photons, exposure, and dose, is decreased. Small voxels, as used for better detail, capture less photons and result in more noise.

For example, if a CT slice thickness is decreased to improve image detail, the noise level will increase because of the smaller voxels. If the mAs is then increased to maintain the same noise level, the radiation dose will be increased. This is why thin CT slices are only used when necessary from a clinical perspective.

Filter algorithms can either decrease or increase noise content depending on what type is selected. Filtering is a preliminary process in many medical image processing applications. It is a fundamental operation in low level computer vision, aiming at restoring a noise-corrupted image to its noiseless counterpart. Any post-processing tasks such as segmentation and feature enhancement benefit from noise reduction.

Extensive research has been conducted to improve image quality based on a single image. Usually, the noise on neighboring pixels is independent and hence can be easily reduced by a low-pass filter. But this filter also blurs the sharp edges in the image. To preserve the high frequency signal in the image, e.g. edges or corners, prior knowledge has to be used to discriminate the signal from the noise. Various methods are proposed to model the high frequency signal in images, e.g. edge modeling based on Markov Random Field or quadratic signal class. The difficulties arise from the fact that accurate modeling of various signal and noise is usually very hard if not impossible.

Multiple images can be obtained in some cases to further improve imaging quality, which is also called image compounding. For example, in ultrasound B-scans, multiple images of the same tissue using different frequency ultrasound can be generated. The speckle noises on different images are proved to be independent. This is different from the traditional multiple-image based super-resolution techniques. In image compounding, the images have the same underlying signal but are corrupted by independent noise. The multiple images do not provide more information for super-resolution but help reducing noise. This topic is much less studied than the single image based restoration methods and is usually handled with very simple weighted averaging, followed by the traditional restoration methods on the averaged image. But these schemes fail to fully utilize the abundant information hinted by the multiple images and cannot significantly improve the image quality with only a small number of images, e.g., 2 or 3 images.

While various techniques exist for image noise reduction, an ideal filtering technique has yet to be introduced. Achieving image noise reduction has proven problematic most often due to new problems arising while undergoing the filtering to reduce noise content. What is desired is a method and system for removing existing noise content and obviating the introduction of new noise content during image reconstruction.

SUMMARY OF THE INVENTION

It is an object of the present invention to provide a novel method and system for multi-image based restoration/compounding.

It is a further object of the invention to utilize an independence measurement of images corrupted by independent noise, where the independence measurement is based on the properties of independent random variables.

It is another object of the invention to dramatically improve the restoration quality and robustness of an image by effectively preventing a signal from being smoothed out as noise.

It is a further object of the invention to improve restoration results using a relatively small number of compounding images by fully exploiting the independency between noises on different images.

It is yet another object of the invention to utilize an independence constraint to reduce the possibility of misclassifying a signal as noise so as to thereby preserve sharp edges and corners in the image without accurate modeling of the same.

It is still another object of the invention to provide a method and system for improving image restoration even under conditions of spatial variant noise and inaccurate signal/noise models.

It is yet another object of the invention to provide a method and system for enhancing the quality of medical images.

In accordance with the foregoing objects and additional objects that will become apparent hereinafter, an aspect of the present invention provides a method for improving image quality by compounding a plurality of images, comprising the steps of: selecting a plurality of images 1 to M; calculating the residual error on each image; calculating the noise likelihood of each image; calculating the signal likelihood of the image; performing an independence analysis to regularize an independence constraint between the residual errors of the images 1 to M; and summing the signal likelihood, noise likelihood and pairwise independency to approximate the joint independency between the residual errors.

These and other advantages of the invention will be apparent to those of ordinary skill in the art by reference to the following detailed description and the accompanying drawings.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of the detailed description would understand that in at least one embodiment, components in the method and system may be implemented in software or hardware.

The invention is a modular framework and is deployed as software as an application program tangibly embodied on a program storage device. The application is accessed through a graphical user interface (GUI). The application code for execution can reside on a plurality of different types of computer readable media known to those skilled in the art. Users access the framework by accessing the GUI via a computer.

Figure 1:
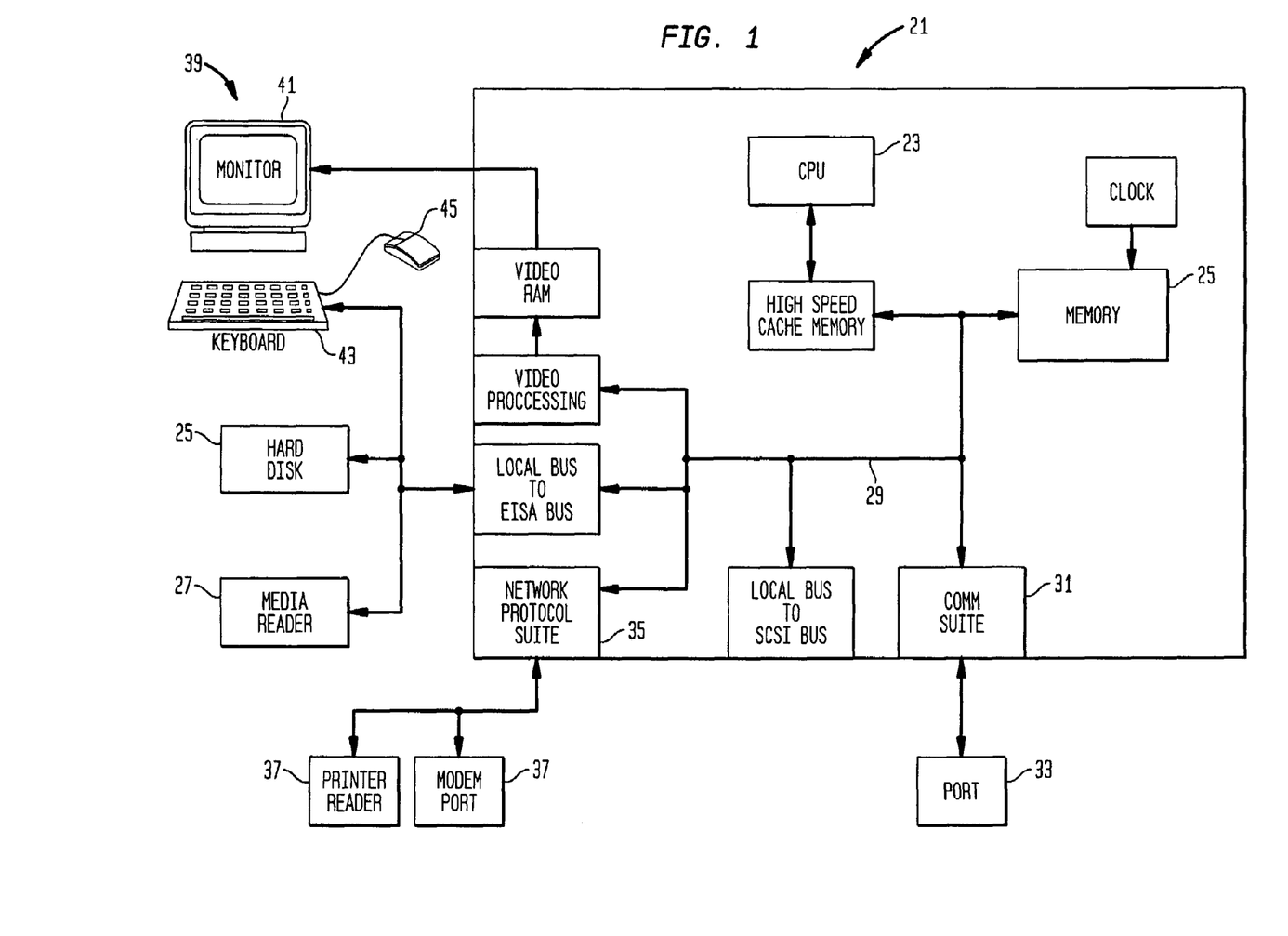
FIG. 1 is a block diagram of an exemplary computer for carrying out aspects of the present invention.

An embodiment of a computer 21 executing the instructions of an embodiment of the invention is shown in FIG. 1. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as TCP/IP (Transmission Control Protocol/Internet Protocol) suite, IPX/SPX (Internetwork Packet eXchange/Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), Blackberry device or conventional personal computer such as a PC, Macintosh, or UNIX based workstation running their appropriate OS (Operating System) capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

The computer 21 includes a suitable image rendering application that can process digital image data of an acquired image dataset to generate and display 2-D and/or 3-D images on the display 41. The image rendering system may be an application that provides 2D/3D rendering and visualization of medical image data and which executes on the computer. The image rendering system enables a user to navigate through a plurality of 2-D image slices or a 3-D image.

To illustrate the compounding algorithm, we start with two images and assume two images $I_1$, $I_2$ have the same underlying signal S (for simplicity, no motion or registration are considered) but are corrupted by independent noise $N_1$, $N_2$, i.e. $I_1=S+N_1$ and $I_2=S+N_2$.

Weighted averaging is widely used to estimate the true signal. Assuming $N_1$ and $N_2$ are zero mean and have the same variance, we have $\hat{I}=(I_1+I_2)/2$. However, a detailed study can show the problem of this scheme. If $\hat{I}$ is the true signal, the noises are: $\hat{N}_1=I_1-\hat{I}$ and $\hat{N}_2=(I_2-\hat{I})$. We can see that the two noise components are totally correlated (i.e. $\hat{N}_1=(I_1-I_2)/2=-\hat{N}_2$), which is in contradiction to N1 and N2 being independent. Only when we have a large number of images, the weighted averaging becomes more accurate and the residual error $\hat{N}_i$ more independent. From this example of compounding two images, it can be easily seen that, even though widely used, simple averaging is not an optimal way to combine the multiple images.

To better compound the multiple images, we propose to enforce the independency between the noise components. If the estimation of the signal is wrong, the error (i.e., S−$\hat{I}$) will be uniformly added to the residual errors (i.e. $\hat{N}_i=N_i+(S-\hat{I})$) on all images and increases the dependency between them. By enforcing the independence constraint, we can prevent misclassifying the signal as noise and hence achieve better restoration result.

In the traditional MAP estimation based image restoration, generative models are used. It assumes that we have the probability distribution models of both noise and signal. Then a MAP estimation can be obtained. It can be easily extended to multiple images. With the assumption that $N_1$, and $N_2$ are independent, we have:

$$P(\hat{I}|I_1, I_2) = c \cdot P(I_1, I_2|\hat{I})P(\hat{I})$$
$$= c \cdot P_{N1}(I_1 - \hat{I})P_{N2}(I_2 - \hat{I})P_S(\hat{I})$$

where c is a normalization constant. $P_{N_i}()$ and $P_S()$ are the prior noise/signal models respectively. Based on Gaussian noise modeling and smooth signal constraint, we can define the cost function $C(\hat{I})$ as follows:

$$\hat{I} = \text{argmin}_{\hat{I}} C(\hat{I}) = \text{argmin}_{\hat{I}} \log(P(\hat{I}|I_1, I_2))$$
$$= \text{argmin}_{\hat{I}} \left(\lambda_1(I_1-\hat{I})^2 + \lambda_2(I_2-\hat{I})^2 + \lambda_3(\hat{I}-\bar{I})^2\right)$$

where $\bar{I}$ is the average intensity of the neighborhood. The first two terms enforce that the estimated image should look like the observed images. The 3rd term models the signal property and prefers smooth signal. Many studies have been focused on the signal modeling based on different energy functions. The MAP estimation can be obtained iteratively based on the derivative of $C(\hat{I})$:

$$\frac{\partial C(\hat{I})}{2 \cdot \partial \hat{I}} = \lambda_1(\hat{I}-I_1) + \lambda_2(\hat{I}-I_2) + \lambda_3(\hat{I}-\bar{I}) = 0$$

Because the $\bar{I}$ is unknown and has to be estimated based on the solution on previous iteration, we can use the iterative minimization process:

$$\hat{I}^{(k+1)} = \frac{(\lambda_1+\lambda_2)(\hat{I}-I_{avg}) + \lambda_3(\hat{I}-\bar{I}^{(k)})}{\lambda_1+\lambda_2+\lambda_3}$$

where $I_{avg}=(\lambda_1 I_1+\lambda_2 I_2)/(\lambda_1+\lambda_2)$. This leads directly to the traditional averaging and filtering scheme. This scheme is the optimal solution if all the assumptions are right and we have very accurate signal/noise models.

Figure 2A:
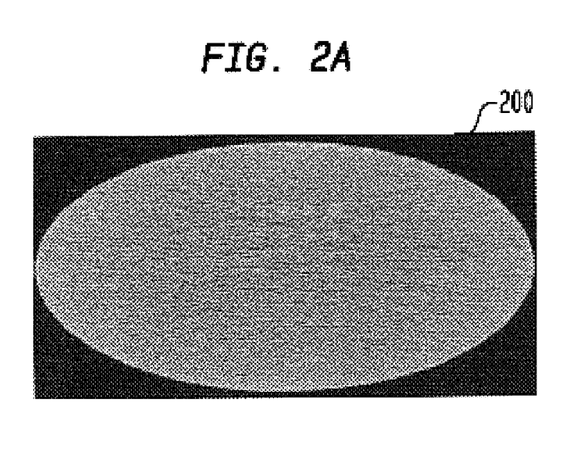
FIG. 2a is a CT image with non-isotropic noise.

However, in reality, obtaining accurate prior models is very difficult if not impossible. For example, in the CT image 200 shown in FIG. 2a, non-isotropic noise can be seen, which is very difficult to distinguish from the edges or lines. In an ultrasound, the speckle noise is non-stationary and dependent on the underlying structures and sub-resolution scatter. Considering all this, this generative model based method cannot provide satisfactory results. On the other hand, the prior knowledge of the independence between the noises, even though used in the derivation of the MAP framework, is never enforced in the optimization. In fact, this knowledge can be very helpful in distinguishing the signal and the noise. To show the robustness and effectiveness of the independent noise constraint, we impose it with the simple smooth signal model and Gaussian noise model in our experiments and still achieve surprisingly sharp compounding results.

When only a single image is available, the only thing we can do is to rely on some assumptions and the prior noise/signal models as in the traditional MAP framework. However, when multiple images of the same scene are available, averaging the images followed by the traditional restoration methods won't give us the optimal solution because it ignores the abundant information in the correlation between different images.

As we have pointed out, in real-world applications, it is almost impossible to obtain very accurate models of all the possible signal and noise. If we have inaccurate models, it will be reflected in the restored image $\hat{I}$, which ideally should be equal to the true signal S. The restoration error (i.e., S−$\hat{I}$) will appear in all the residual errors:

$$\hat{N}_i = I_i - \hat{I} = N_i + (S-\hat{I})$$

Because (S−$\hat{I}$) is common for all the images, the correlation between the residual errors will increase with the restoration error. So the independency between the residual errors provides an elegant way for us to detect and correct the restoration error caused by invalid assumptions or inaccurate signal/noise models.

However, since the strict independency (i.e., $p(N_1,N_2)=p(N_1)p(N_2)$) is very expensive to evaluate, we rely on one of the important properties of the independent random variables:

$$E(h_1(N_1)h_2(N_2))=E(h_1(N_1))E(h_2(N_2))$$

where $h_1()$ and $h_2()$ are any kind of functions of $N_1$ and $N_2$ respectively. $E()$ is the expectation value.

If we choose $h_1(N_1)=N_1$ and $h_2(N_2)=N_2$, the independent noise constraint is reduced to uncorrelated noise constraint. When the noise is Gaussian distributed, they are equivalent. In our experiments, we used this approximated constraint instead of enforcing real independency and have achieved very good results. More complex $h_1()$ or $h_2()$ (e.g. higher order moments) can be used for more accurate approximation of independence constraint if necessary.

As explained above, we should explicitly enforce the independence between the noises to reduce the restoration errors caused by the invalid assumptions or inaccurate signal/noise models. We propose to use the traditional energy minimization framework, with an additional energy term derived from the above equation: $E(h_1(N_1)h_2(N_2))=E(h_1(N_1))E(h_2(N_2))$. The new energy term regularizing the independence constraint between the residual errors of image i and j (i.e., $\hat{N}i=Ii-\hat{I}$ and $\hat{N}j=Ij-\hat{I}$ can be defined as follows:

$$e_{i,j}(\hat{N}_i,\hat{N}_j)=\|E(h_1(\hat{N}_i)h_2(\hat{N}_j))-E(h_1(\hat{N}_i))E(h_2(\hat{N}_j))\|^2$$

where E( ) is the expectation and can be calculated in a small neighborhood (e.g. 15 by 15 in our experiments). For accuracy, one skilled in the art will appreciate that we can also add several terms based on different $h_1(\ )$ and $h_2(\ )$ to better measure the independency.

For multiple images, we use the sum of the pairwise independency to approximate the joint independency between the residual errors. The new objective function with independence constraint is now defined as:

$$I = \arg\min_{\hat{I}} C(\hat{I}) = \arg\min_{\hat{I}} (\lambda_0(I_1-\hat{I})^2 + \sum_i^N \lambda_i(I_2-\hat{I})^2 + \lambda_{N+1}\sum_{j=1}^{N-1}\sum_{k=j+1}^N e_j,k)$$

To find the optimal solution, as will be appreciated by those skilled in the art, an iterative optimization process can be easily designed similar to the traditional MAP framework described above.

Figure 2B:
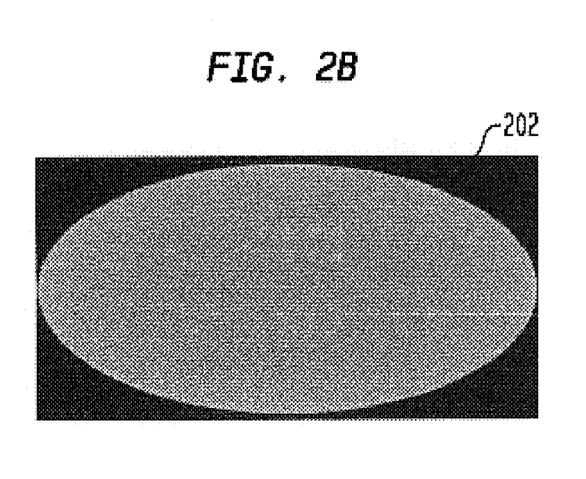
FIG. 2b is a CT image that has undergone restoration in accordance with an aspect of the invention.

To demonstrate the robustness of the compounding method in accordance with an aspect of the present invention, it was applied to some difficult medical images, where accurate signal/noise models were hard to obtain. First, a set of three CT images were tested. In the CT images, the noise is not isotropic but looks more like line structures, while the non-isotropy can hardly be predicted. The traditional edge modeling cannot distinguish such noise from the signal. We applied the simple smooth signal model in the objective function in accordance with the following equation:

$$I = \arg\min_{\hat{I}} C(\hat{I}) = \arg\min_{\hat{I}} (\lambda_0(I_1-\hat{I})^2 + \sum_i^N \lambda_i(I_2-\hat{I})^2 + \lambda_{N+1}\sum_{j=1}^{N-1}\sum_{k=j+1}^N e_j,k)$$

and achieved very good restoration 202 as shown in FIG. 2b. We can see that the noise is dramatically removed while the weak signals (i.e. the various circles) are well preserved with sharp boundaries except the very weak ones.

Figure 3A:
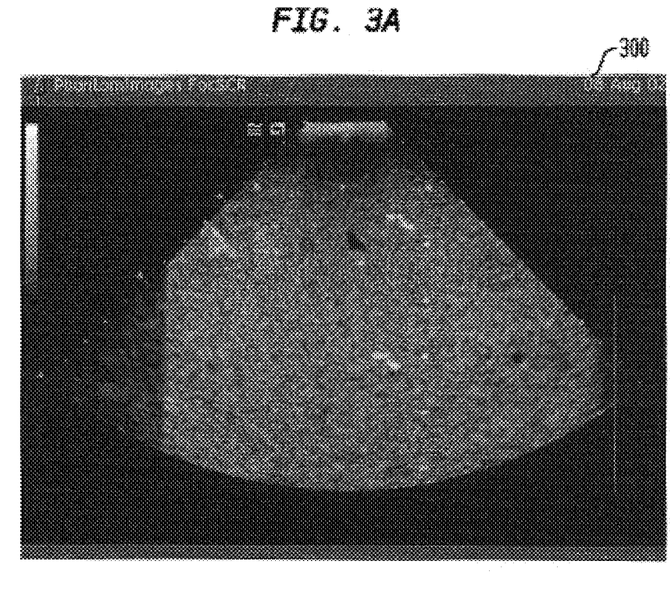
FIG. 3a is one frame of an original image used in an experiment for mitigating noise in accordance with an aspect of the invention.
Figure 3B:
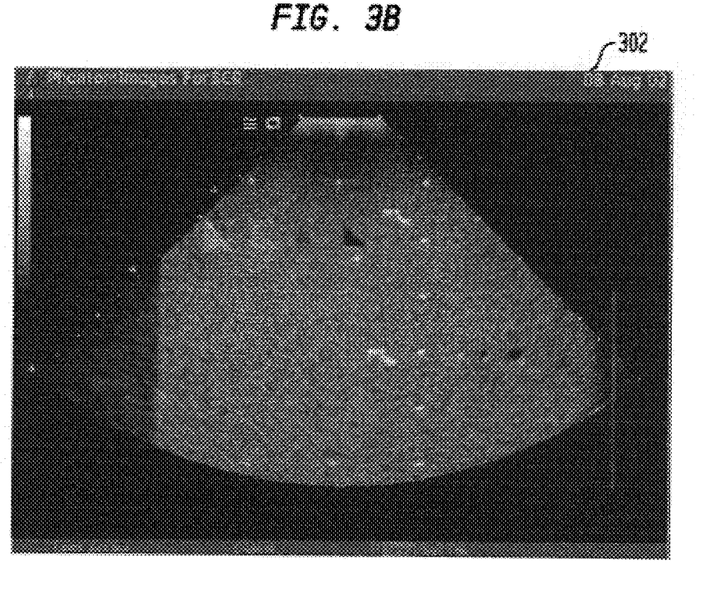
FIG. 3b is an average of three images scanned at ultrasound of differing frequencies.

We also tested the algorithm for ultrasound frequency compounding. Three images were scanned at different frequency ultrasound. Because the acoustic signal has been taken log( ) prior to converting to the display images, we made the assumption that the multiplicative speckle noise in the acoustic signal was additive and applied our compounding technique to restore the underlying signal. One of the three original images 300 is shown in FIG. 3a. Averaging the three images does not reduce the noise dramatically due to the small number of compounding images (302 as shown in FIG. 3b).

Figure 3C:
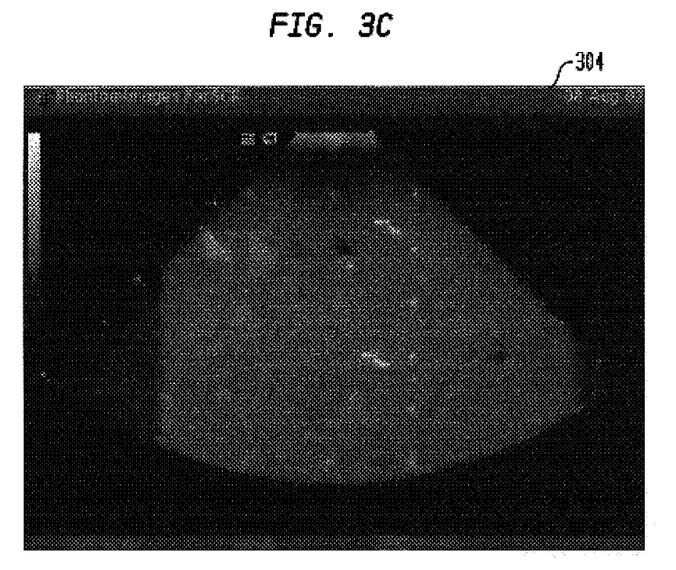
FIG. 3c is an image that has been applied to an adaptive Wiener filter.

To apply the adaptive image filtering on the averaged image, the main difficulty is the non-stationary noise, which is also dependent on the structure, making accurate modeling almost impossible. We used the adaptive Wiener filter (with 15 by 15 neighborhood) in Matlab for comparison. The result 304 is shown in FIG. 3c. As can be seen in the image, a strong signal can be detected and preserved well. However, the weak features are severely blurred while the noise region is not smoothed enough.

The algorithm in accordance with an aspect of the invention exploits the correlations between the residual errors with the simple noise/signal models as shown in the equation:

$$I = \arg\min_{\hat{I}} C(\hat{I}) = \arg\min_{\hat{I}} (\lambda_0(I_1-\hat{I})^2 + \sum_i^N \lambda_i(I_2-\hat{I})^2 + \lambda_{N+1}\sum_{j=1}^{N-1}\sum_{k=j+1}^N e_j,k).$$

Figure 3D:
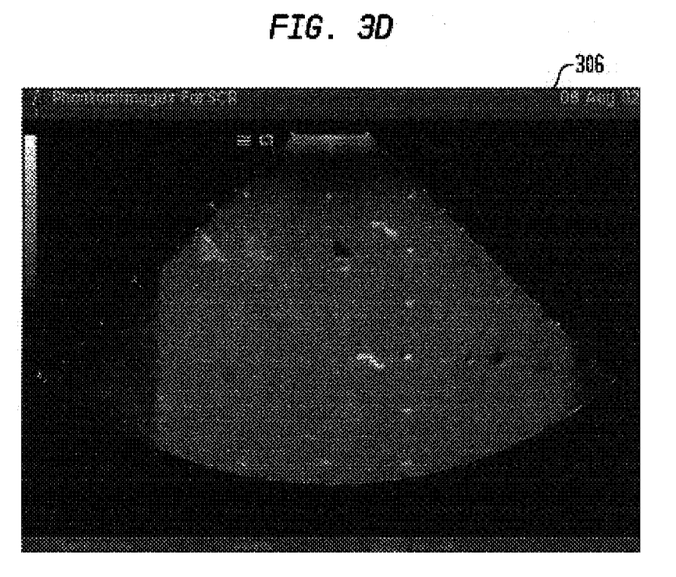
FIG. 3d is an image that has been processed in accordance with an aspect of the invention.

The result 306 is depicted in FIG. 3d. Without the independence constraint, this simple noise/signal modeling will severely blur all the structures in the image due to the lack of edge modeling, generating much worse filtering result than the adaptive Wiener filter. But with the independence constraint, it prevents misclassifying signal to noise. The weak edges are shown to be preserved much better, while the noise regions are smoother than those after using the adaptive Wiener filter.

Figure 4:
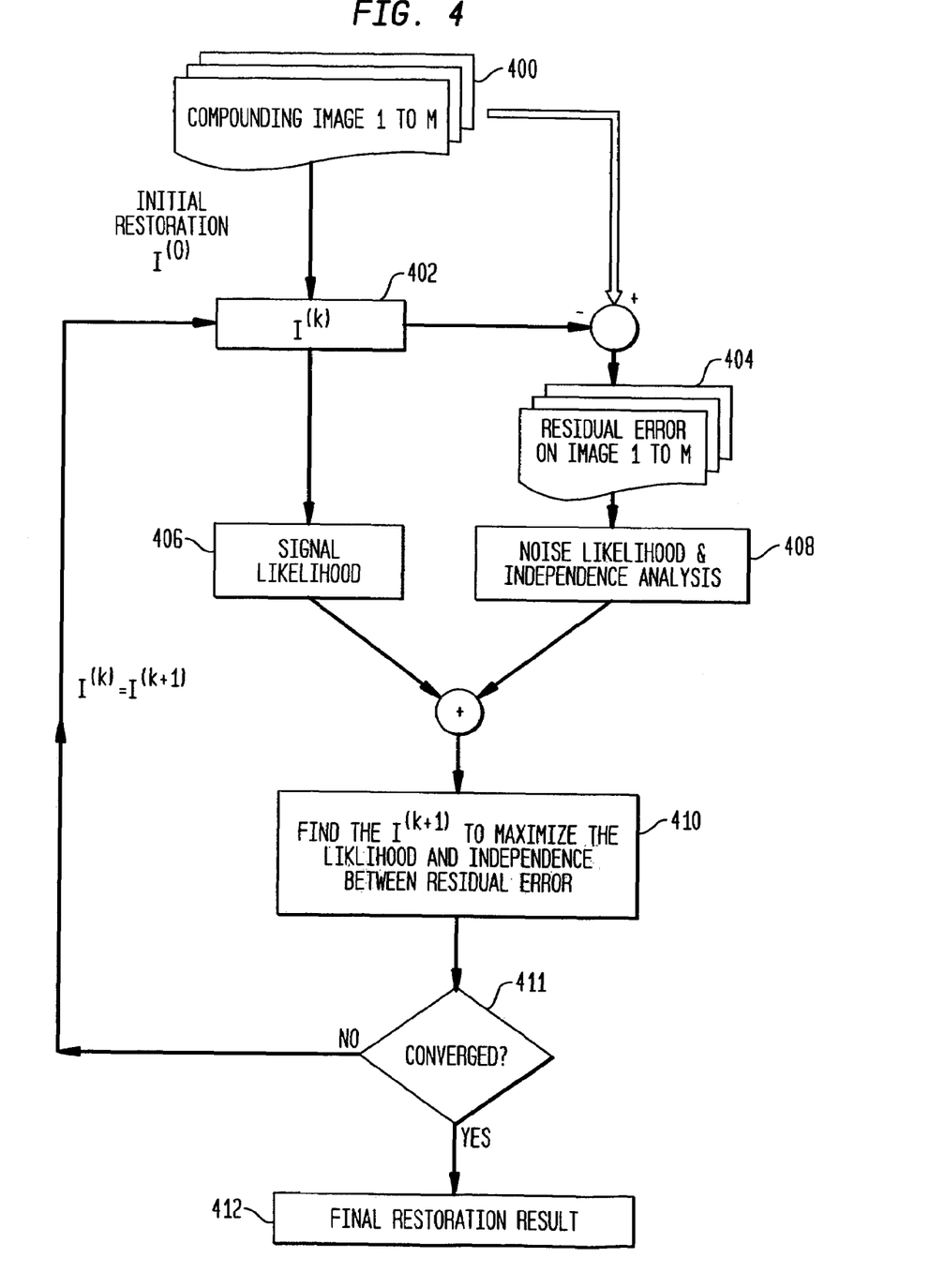
FIG. 4 is a flow diagram of a process in accordance with the present invention.

Referring now to FIG. 4, there is depicted a flow diagram of a process in accordance with an aspect of the invention. In block 400, images 1 to M are compounded. In this regard, the input images have the same signal but are corrupted by the independent noise. The formulation is described above and represented by, for example, assuming two images, $I_1$, $I_2$ that have the same underlying signal S (for simplicity, no motion or registration are considered) and are corrupted by independent noise $N_1$, $N_2$, i.e. $I_1=S+N_1$ and $I_2=S+N_2$. Since the image is reconstructed using an iterative method, $I^{(k)}$ in block 402 represents the kth round solution. This will be updated until it converges to the optimal solution. Block 404 represents the residual error on each image 1 to M. The errors are calculated by an error engine and are represented by the equation $\hat{N}_i=I_i-\hat{I}=N_i+(S-\hat{I})$. The term engine refers to the logic implementing the method currently under discussion. As described in the foregoing, because $(S-\hat{I})$ is common for all the images, the correlation between the residual errors will increase with the restoration error. So the independency between the residual errors provides an elegant way to detect and correct the restoration error caused by invalid assumptions or inaccurate signal/noise models. Block 406 represents the signal likelihood which is the last term in the following equation:

$$P(\hat{I}|I_1,I_2)=c\cdot P(I_1,I_2|\hat{I})=P(\hat{I})c\cdot P_{N1}(I_1-\hat{I})P_{N2}(I_2-\hat{I})P_S(\hat{I}).$$

The noise likelihood is shown at block 408 and represented by the terms $P_{N1}$ and $P_{N2}$ in the above equation. At block 408 the independence analysis is calculated by an independence analysis engine and represented by the following equation: $e_{i,j}(\hat{N}_i, \hat{N}_j)=\|E(h_1(\hat{N}_i)h_2(\hat{N}_j))-E(h_1(\hat{N}_i))E(h_2(\hat{N}_j))\|^2$.

At block 410, the $I^{(k+1)}$ is determined to maximize the likelihood and independence between residual errors by summing the previous three terms (signal likelihood, noise likelihood and pairwise independency) listed in the following equation:

$$I = \arg\min_{\hat{I}} C(\hat{I}) =$$

$$\mathrm{argmin}_{\hat{I}} \, (\lambda_0 (I_1 - \hat{I})^2 + \sum_i^N \lambda_i (I_2 - \hat{I})^2 + \lambda_{N+1} \sum_{j=1}^{N-1} \sum_{k=j+1}^{N} e_j, k).$$

An iterative optimization is performed until the result has converged at block 411, to provide the final restoration result 412 as shown, for example, in FIG. 3d.

Although the invention herein has been described with reference to particular embodiments, it is to be understood that these embodiments are merely illustrative of the principles and applications of the present invention. Moreover, although hardware or software have been used to implement certain functions described in the present invention, it will be understood by those skilled in the art that such functions may be performed using hardware, software or a combination of hardware and software. It is therefore to be understood that numerous modifications may be made to the illustrative embodiments and that other arrangements may be devised without departing from the spirit and scope of the present invention as defined by the appended claims.

What is claimed is:

1. A method for improving image quality by compounding a plurality of images using a computer to perform the steps of, 
compounding a plurality of images 1 to M;
calculating a residual error on each of the plurality of images 1 to M;
calculating a noise likelihood of each image;
calculating a signal likelihood of a compound image;
calculating a pairwise independency between the residual errors of the plurality of images 1 to M;
and summing the signal likelihood, noise likelihood and pairwise independency to approximate a joint independency between the residual errors of the plurality images 1 to M, wherein a restoration result is determined as the compound image having noise removed according to the joint independency between the residual errors of the plurality of images 1 to M.

2. The method for improving image quality recited in claim 1, wherein the residual error is represented by $\hat{N}_i = I_i - \hat{I} = N_i + (S-\hat{I})$, where $\hat{N}_i$ is the noise of each image, $I_i$ is the image, and $\hat{I} = (I_{i\,+2})/2$ is the average intensity and S is the underlying signal.

3. The method for improving image quality recited in claim 2, wherein the signal likelihood is represented by a prior model $P_s(\hat{I})$ and the noise likelihood is represented by prior models $P_{n_1}, P_{n_2}$.

4. The method for improving image quality recited in claim 3, further comprising introducing the independence constraint to improve restoration quality wherein an energy term regularizing the independence constraint between the residual errors of the images is represented by $e_{i,j}(\hat{N}_i, \hat{N}_j) = \|E(h_1(\hat{N}_i)h_2(\hat{N}_j)) - E(h_1(\hat{N}_1))E(h_2(\hat{N}_j))\|^2$.

5. The method for improving image quality as recited in claim 4, wherein summing the signal the likelihood, noise likelihood and pairwise independency to approximate the joint independency between the residual errors is represented by $$I = \mathrm{argmin}_{\hat{I}} \, C(\hat{I}) =$$

$$\mathrm{argmin}_{\hat{I}} \, (\lambda_0 (I_1 - \hat{I})^2 + \sum_i^N \lambda_i (I_2 - \hat{I})^2 + \lambda_{N+1} \sum_{j=1}^{N-1} \sum_{k=j+1}^{N} e_j, k).$$

6. The method for improving image quality as recited in claim 5, further comprising the steps of iteratively optimizing $I^{(k+l)}$ to maximize the likelihood and independence between residual errors.

7. A computer readable medium embodying instructions executable by a processor to perform a method for improving image quality by compounding a plurality of images, by:
compounding a plurality of images 1 to M;
calculating a residual error on each of the plurality of images 1 to M;
calculating a noise likelihood of each image;
calculating a signal likelihood of a compound image;
calculating a pairwise independency between the residual errors of the plurality of images 1 to M;
and summing the signal likelihood, noise likelihood and pairwise independency to approximate a joint independency between the residual errors of the plurality of image 1 to M, wherein a restoration result is determined as the compound image having noise removed according to the joint independency between the residual errors of the plurality of image 1 to M.

8. The computer readable medium recited in claim 7, wherein the residual error is represented by (equation) where N (sub i) is the noise of each image, I(sub i) is the image, and I =(I1+I2)/2 is the average intensity and S is the underlying signal.

9. The computer readable medium recited in claim 8 wherein the signal likelihood is represented by a prior model $P_s(\hat{I})$ and the noise likelihood is represented by prior models $P_{N_1}, P_{N_2}$.

10. The computer readable medium recited in claim 9, further comprising introducing the independence constraint to improve restoration quality wherein an energy term regularizing the independence constraint between the residual errors of the images is represented by $e_{i,j}(\hat{N}_i, \hat{N}_j) = \|E(h_1(\hat{N}_i)h_2(\hat{N}_j)) - E(h_1(\hat{N}_1))E(h_2(\hat{N}_j))\|^2$.

11. The computer readable medium recited in claim 10, wherein summing the signal likelihood, noise likelihood and pairwise independency to approximate the joint independency between the residual errors is represented by $$I = \mathrm{argmin}_{\hat{I}} \, C(\hat{I}) =$$

$$\mathrm{argmin}_{\hat{I}} \, (\lambda_0 (I_1 - \hat{I})^2 + \sum_i^N \lambda_i (I_2 - \hat{I})^2 + \lambda_{N+1} \sum_{j=1}^{N-1} \sum_{k=j+1}^{N} e_j, k).$$

12. The computer readable medium recited in claim 11, wherein the program instructions when executed by the processor, enable the computer to iteratively optimize $I^{(k+l)}$ to maximize the likelihood and independence between residual errors.

13. A system for improving image quality by compounding a plurality of images, comprising: means for selecting and compounding a plurality of images 1 to M; an error engine for calculating the residual error on each of the plurality of images 1 to M;
a noise engine for calculating the noise likelihood of each image;

a signal likelihood engine for calculating the sisal likelihood of a compound image; an independence analysis engine for calculating a pairwise independency between the residual errors of the images 1 to M;

and a summing engine for summing the signal likelihood, noise likelihood and pairwise independency to approximate the joint independency between the residual errors of the images 1 to M, wherein a restoration result is determined as the compound image having noise removed according to the joint independency between the residual errors of the plurality of image 1 to M.

* * * * *